United States Patent
Yokoi et al.

(10) Patent No.: US 6,207,948 B1
(45) Date of Patent: Mar. 27, 2001

(54) COLOR FILTER, DISPLAY DEVICE USING COLOR FILTER, APPARATUS COMPRISING DISPLAY DEVICE, INK-JET HEAD, AND COLOR FILTER MANUFACTURING METHOD AND APPARATUS

(75) Inventors: Hideto Yokoi; Hiroshi Sato; Katsuhiro Shirota; Takeshi Miyazaki; Akio Kashiwazaki; Shoji Shiba, all of Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/250,396

(22) Filed: Feb. 16, 1999

Related U.S. Application Data

(62) Division of application No. 08/525,428, filed on Sep. 7, 1995, now Pat. No. 5,956,063.

(30) Foreign Application Priority Data

Sep. 14, 1994 (JP) ...................................... 6-220403

(51) Int. Cl.[7] .................... G01J 3/50; B41J 2/01
(52) U.S. Cl. ............... 250/226; 250/548; 347/107; 427/64
(58) Field of Search .................... 250/226, 548, 250/559.3; 356/375; 427/64, 162, 165, 256, 287; 347/107, 1

(56) References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 5,576,070 | 11/1996 | Yaniv .................... 427/510 |
| 5,670,205 | * 9/1997 | Miyazaki et al. ............ 427/64 |
| 5,847,720 | 12/1998 | Dunand ................... 347/1 |

FOREIGN PATENT DOCUMENTS

| | | |
|---|---|---|
| 0 382 502 | 8/1990 | (EP) . |
| 0 461 759 | 12/1991 | (EP) . |
| 0 540 244 | 5/1993 | (EP) . |
| 2 592 337 | 7/1987 | (FR) . |
| 54-56847 | 5/1979 | (JP) . |
| 59-75205 | 4/1984 | (JP) . |
| 59-123670 | 7/1984 | (JP) . |
| 59-138461 | 8/1984 | (JP) . |
| 60-71260 | 4/1985 | (JP) . |
| 63-235901 | 9/1988 | (JP) . |
| 1-217302 | 8/1989 | (JP) . |
| 2-173704 | 7/1990 | (JP) . |
| 4-123005 | 4/1992 | (JP) . |
| 4-195102 | 7/1992 | (JP) . |
| 5-241012 | 9/1993 | (JP) . |
| 6-118217 | 4/1994 | (JP) . |
| 6-182987 | 7/1994 | (JP) . |
| WO 95-21400 | 8/1995 | (WO) . |

* cited by examiner

*Primary Examiner*—Stephone B. Allen
(74) *Attorney, Agent, or Firm*—Fitzpatrick, Cella, Harper & Scinto

(57) ABSTRACT

A method for manufacturing a color filter colors a large number of filter elements on a substrate respectively in a predetermined color. A filter element is colored while an ink-jet head nozzle and the filter element are aligned. The method comprises a detection step of detecting the position of the filter element, a correction step of correcting a relative position of the filter element and a discharge nozzle for discharging coloring material, based on position information of the filter element detected at the detection step, so that the filter element and the discharge nozzle are aligned, and a coloring step of coloring the filter element by discharging the coloring material by the discharge nozzle.

19 Claims, 15 Drawing Sheets

MOVEMENT OF IJH VIEWED FROM SUBSTRATE

MOVEMENT OF IJH VIEWED FROM SUBSTRATE

MOVEMENT OF IJH VIEWED FROM SUBSTRATE

MOVEMENT OF IJH VIEWED FROM SUBSTRATE

COLOR FILTER, DISPLAY DEVICE USING COLOR FILTER, APPARATUS COMPRISING DISPLAY DEVICE, INK-JET HEAD, AND COLOR FILTER MANUFACTURING METHOD AND APPARATUS

This application is a divisional application of U.S. application Ser. No. 08/525,428, filed Sep. 7, 1995, now U.S. Pat. No. 5,956,063.

BACKGROUND OF THE INVENTION

FIELD OF THE INVENTION

This invention relates to a color filter, manufactured by coloring a number of filter elements on a substrate, partitioned by a light-shielding portion of a predetermined pattern formed on the substrate, a display device using the color filter, an apparatus comprising the display device, an ink-jet head, and a method and apparatus for manufacturing the color filter.

With recent advances in personal computers, especially portable personal computers, the demand for liquid crystal displays tends to rise, especially color liquid crystal displays. However, in order to further popularize the use of liquid crystal displays, a reduction in cost must be achieved. Especially, it is required to reduce the cost of a color filter which occupies a large proportion of the total cost. Various methods have been tried to satisfy the required characteristics of color filters while meeting the above requirements. However, a method capable of satisfying all the requirements has not been established. The current methods will be described below.

The first method is a coloring method, which is the most popular method. In the coloring method, a water-soluble polymer material as a colorable material is coated on a glass substrate, and the coating is patterned into a desired shape by a photolithography process. The obtained pattern is dipped in a color bath to obtain a colored pattern. This process is repeated three times to form R, G, and B color filter layers.

The second method is a pigment dispersion method, which is currently replacing the coloring method. In this method, a pigment-dispersed photosensitive resin layer is formed on a substrate and patterned into a single-color pattern. This process is repeated three times to obtain R, G and B color filter layers.

The third method is an electrodeposition method. In this method, a transparent electrode is patterned on a substrate, and the resultant structure is dipped in an electrodeposition coating fluid containing a pigment, a resin, an electrolyte, and the like to be colored in the first color by electrodeposition. This process is repeated three times to form R, G and B color filter layers. Finally, these layers are calcined.

The fourth method is a printing method of dispersing a pigment in a thermosetting resin, performing a print operation three times to form R, G and B coatings separately, and thermosetting the resins, thereby forming colored layers. In the above methods, a protective layer is generally formed on the colored layers.

The point common to these methods is that the same process must be repeated three times to obtain layers colored in three colors, i.e., R, G and B. This results in an increase in cost. In addition, as the number of processes increases, the yield decreases. In the electrodeposition method, limitations are imposed on pattern shapes which can be formed. For this reason, with the existing techniques, this method cannot be applied to TFTs (thin film transistors). In the print method, a pattern with a fine pitch cannot be formed because of poor resolution and unevenness.

In order to eliminate these drawbacks, methods of manufacturing color filters by ink-jet systems are disclosed in Japanese Patent Laid-Open Nos. 59-75205, 63-235901, 1-217302 and 4-123005.

In the above manufacturing methods by the conventional ink-jet systems, an ink-jet head is scanned on a substrate to color a number of filter elements. However, these methods have a problem in that positions of filter elements are slightly shifted from coloring dot positions of the ink-jet head, because in these methods, change of intervals between the filter elements and change of arrangement of the filter elements, due to temperature change and temperature distribution of substrate, are not considered. This causes white omissions and other problems in the filter elements.

SUMMARY OF THE INVENTION

The present invention has been made in consideration of the above situations, and its object is to provide a color filter, manufactured by coloring filter elements while maintaining positions of ink-jet head and those of filter elements exactly aligned, a color display using the color filter, a method and apparatus for manufacturing the color filter.

According to the present invention, the foregoing object is attained by providing a color-filter manufacturing method for manufacturing a color filter by coloring a large number of filter elements respectively in a predetermined color, on a substrate, comprising:

a detection step of detecting a position of a filter element on the substrate;

a correction step of correcting a relative position of the filter element and a discharge nozzle for discharging coloring material so that the filter element and the discharge nozzle are aligned, based on position information of the filter element detected at the detection step; and a coloring step of coloring the filter element by discharging the coloring material from the discharge nozzle, at a position after correction of the relative position at the correction step, to the filter element.

Further, the present invention provides a color-filter manufacturing apparatus for manufacturing a color filter by coloring a large number of filter elements, respectively in a predetermined color, on a substrate, comprising:

a discharge nozzle for discharging coloring material to color the filter element;

moving means for moving the discharge nozzle or the substrate, relatively to each other;

a first position-detection sensor, at which a relative position of the filter element and the discharge nozzle is set in advance, integrally provided with the discharge nozzle; and control means for controlling the moving means so that the filter element and the discharge nozzle are aligned, based on position information of the filter element detected by the first position-detection sensor, and controlling the discharge nozzle to discharge the coloring material, in a state where the filter element and the discharge nozzle are aligned, to color the filter element.

Further, the present invention provides an ink-jet head for coloring a large number of filter elements, respectively in a predetermined color, on a substrate, by discharging coloring material, comprising:

a discharge nozzle for discharging the coloring material; and detection means for detecting a relative position of the discharge nozzle and the filter element.

Further, the present invention provides a color filter manufactured by coloring a large number of filter elements, respectively in a predetermined color, on a substrate, the color filter being manufactured by a method comprising:

a detection step of detecting a position of a filter element on the substrate;

a correction step of correcting a relative position of the filter element and a discharge nozzle for discharging coloring material so that the filter element and the discharge nozzle are aligned, based on position information of the filter element detected at the detection step; and a coloring step of coloring the filter element by discharging the coloring material from the discharge nozzle, at a position after correction of the relative position at the correction step, to the filter element.

Further, the present invention provides a display device having a color filter manufactured by coloring a large number of filter elements, respectively in a predetermined color, on a substrate, comprising:

the color filter being manufactured by a method comprising:

a detection step of detecting a position of a filter element on the substrate;

a correction step of correcting a relative position of the filter element and a discharge nozzle for discharging coloring material so that the filter element and the discharge nozzle are aligned, based on position information of the filter element detected at the detection step; and a coloring step of coloring the filter element by discharging the coloring material from the discharge nozzle, at a position after correction of the relative position at the correction step, to the filter element; and light-amount varying means for varying amount of light, integrally used with the color filter.

Further, the present invention provides an apparatus comprising a display device having a color filter manufactured by coloring a large number of filter elements, respectively in a predetermined color, on a substrate, comprising:

the display device comprising:

the color filter being manufactured by a method comprising:

a detection step of detecting a position of a filter element on the substrate;

a correction step of correcting a relative position of the filter element and a discharge nozzle for discharging coloring material so that the filter element and the discharge nozzle are aligned, based on position information of the filter element detected at the detection step; and a coloring step of coloring the filter element by discharging the coloring material from the discharge nozzle, at a position after correction of the relative position at the correction step, to the filter element; and light-amount varying means for varying amount of light, integrally used with the color filter; and image-signal supply means for supplying an image signal to the display device.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention ill now be described in detail in accordance with the accompanying drawings.

[First Embodiment]

Figure 1:
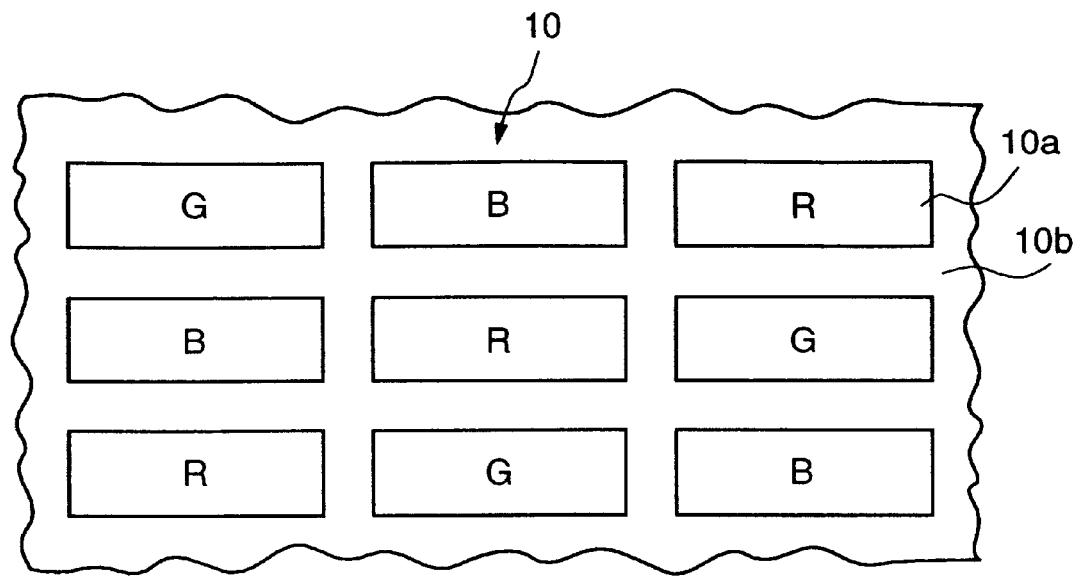
FIG. 1 is a partial enlarged view showing a color filter manufactured by a manufacturing method and apparatus according to the present invention.

FIG. 1 is a partial enlarged view showing a color filter manufactured by a manufacturing method according to a first embodiment of the present invention.

A color filter 10 is mounted on the front surface of a color liquid crystal display or the like used for a portable personal computer or the like. At the rear-surface side, so-called "backlight" as a light source is provided, and picture elements such as liquid crystal shutters, for controlling the transmission of light in accordance with applied voltages, are provided between the filter 10 and the backlight. As shown in FIG. 1, the filter elements 10a colored in R (red), G (green) and B(blue) are two-dimensionally arranged in a matrix form. A black light-shielding grating 10b is formed between the filter elements 10a to make the boundaries between the filter elements 10a clear so as to provide a clear screen.

Figure 2:
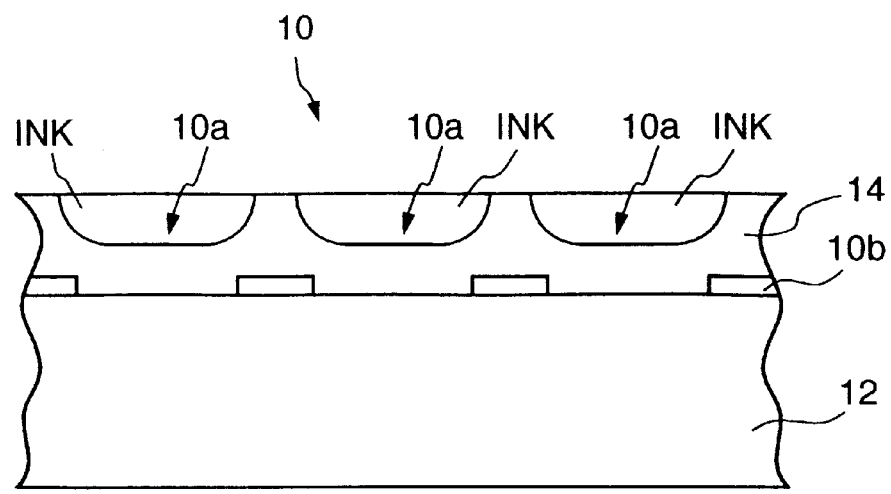
FIG. 2 is a cross-sectional view showing the color filter in FIG. 1.

FIG. 2 is a cross-sectional view showing the color filter 10 in FIG. 1. The light-shielding grating 10b is formed on a color filter glass substrate 12 (hereinafter also referred to as "glass substrate" and "color filter substrate") constituting the main body of the color filter 10. The filter elements 10a of the respective colors are formed on the light-shielding grating 10b.

In manufacturing the color filter 10, chromium is deposited on the glass substrate 12 by sputtering, and the resultant film is formed into a matrix pattern by photolithography. This pattern is the light-shielding grating 10b. A layer 14, comprising cellulose, acrylic resin, gelatin or the like, to be colored is formed on the light-shielding grating 10b. Droplets (to be referred as "ink") containing coloring material (dye) are sprayed on the filter element formation areas of the layer 14 by a recording head of the ink-jet system. With this process, the layer 14 is colored to form the color filter elements 10a. Note that if droplets of dispersed pigment are sprayed instead of coloring material, the layer 14 may be omitted.

Figure 14:
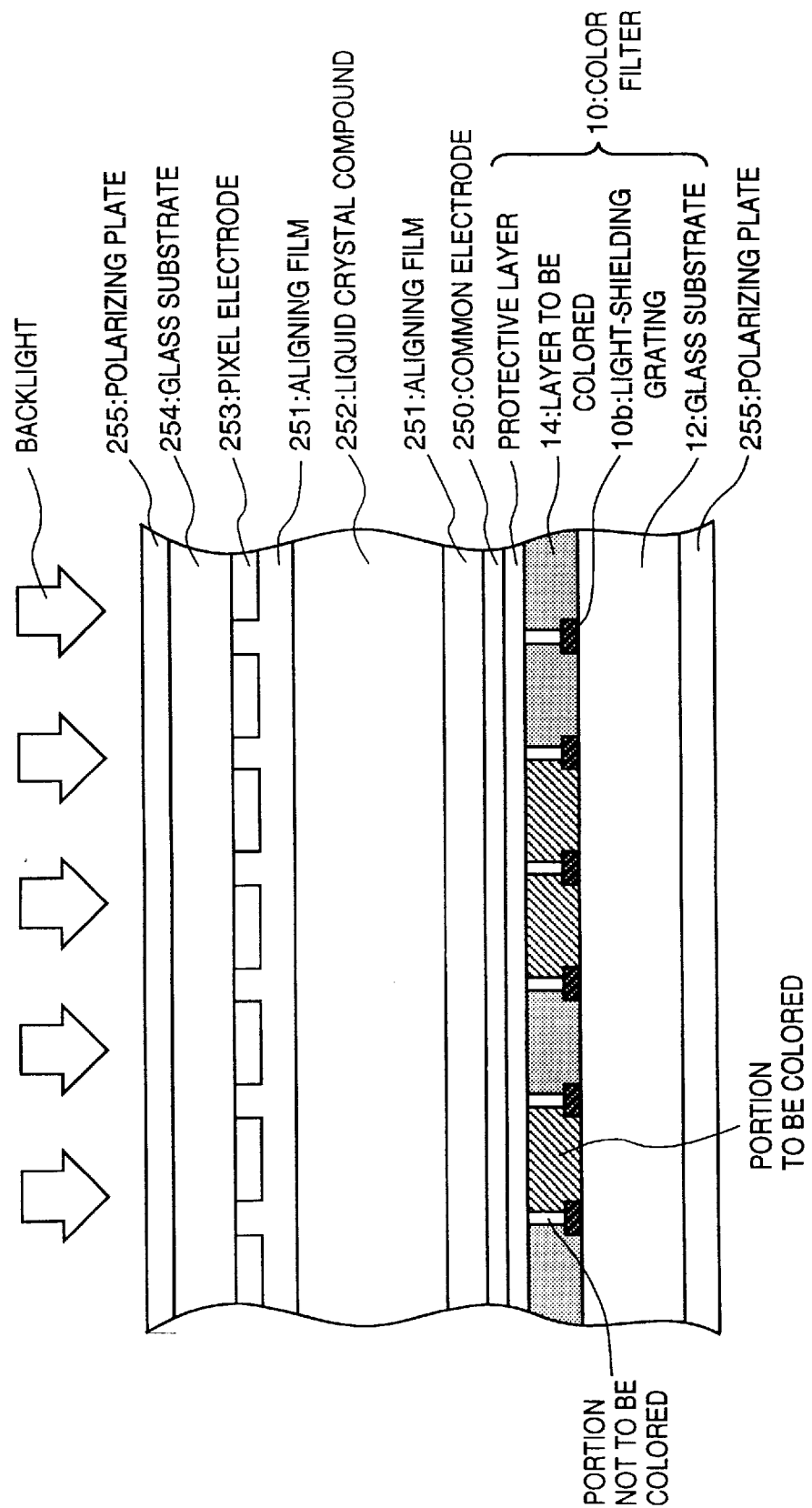
FIGS. 14 and 15 are cross-sectional views showing the structure of a color liquid crystal panel.

As shown in FIG. 14, generally, a color liquid crystal panel is formed by joining the color filter substrate 12 to a counter substrate 254 and sealing a liquid crystal compound 252 therebetween. TFTs (not shown) and transparent pixel electrodes 253 are formed on the inner surface of one substrate (counter substrate 254) of the liquid crystal panel in a matrix form. The color filter 10 is placed on the inner surface of the other substrate (color filter substrate 12) such that the R, G and B coloring materials are positioned to oppose the pixel electrodes. A transparent counter electrode (common electrode) 250 is formed on the entire surface of the color filter 10. The light-shielding grating 10b is generally formed on the color filter substrate 12 side (see FIG. 14). However, in a BM (black matrix) on-array type liquid crystal panel, the grating is formed on the TFT side opposing the color filter substrate (see FIG. 15). Aligning films 251 are formed within the planes of the two substrates. By performing a rubbing process for the aligning films 251, the liquid crystal molecules can be aligned in a predetermined direction. Polarizing plates 255 are bonded to the outer surface of the respective glass substrates. The liquid crystal compound 252 is filled in the gap (about 2 to 5 mm) between these glass substrates. As a backlight, a combination of a fluorescent lamp (not shown) and a scattering plate (not shown) is generally used. A display operation is performed by causing the liquid crystal compound to serve as an optical shutter for changing the transmittance for light emitted from the backlight.

A case where the above liquid crystal panel is applied to an information processing apparatus will be described below with reference to FIGS. 16 to 18.

Figure 16:
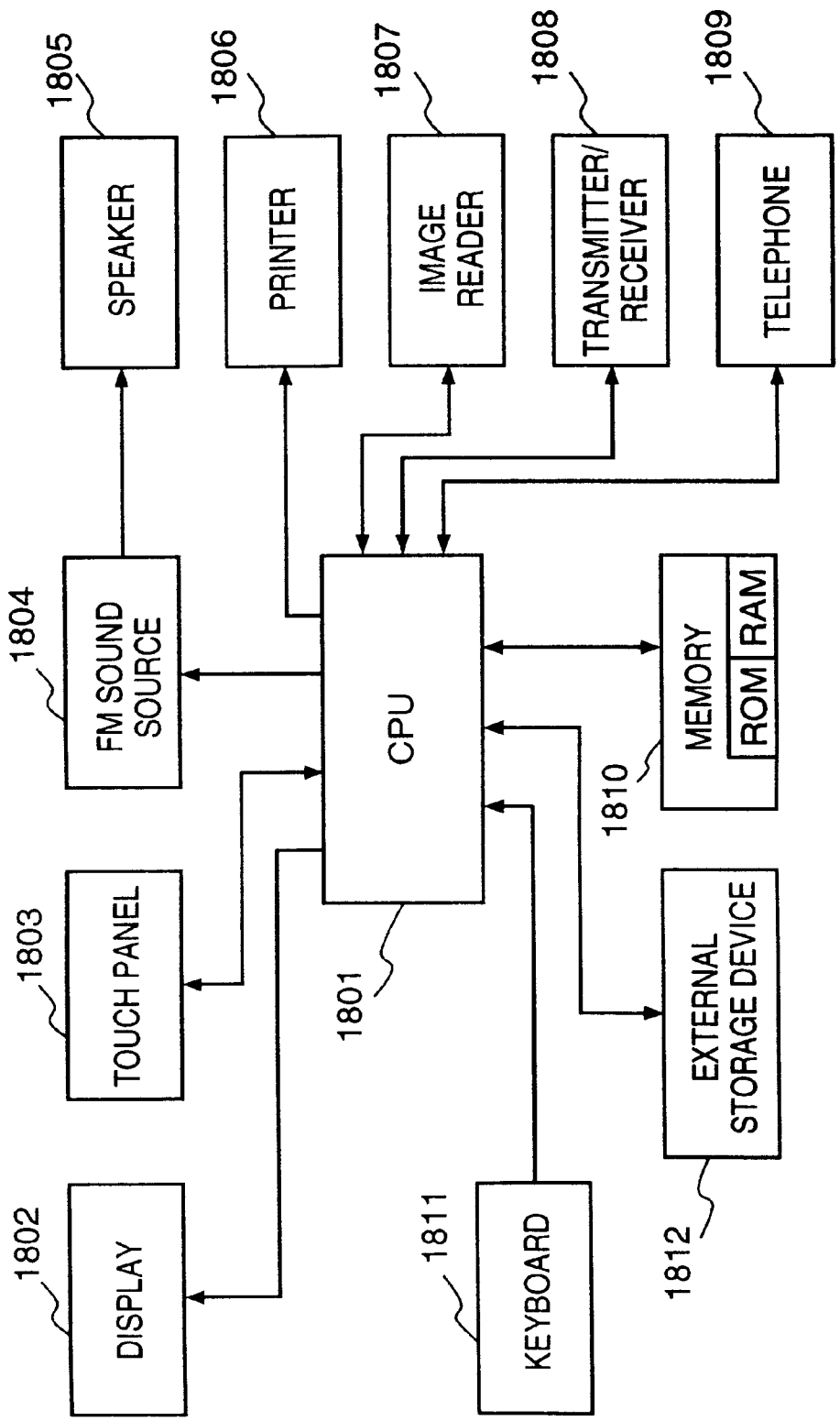
FIG. 16 is a block diagram showing the construction of an information processing apparatus using the liquid crystal panel.

FIG. 16 is a block diagram showing the schematic construction of an information processing apparatus serving as a word processor, a personal computer, a facsimile apparatus, and a copying machine, to which the above liquid crystal panel is applied.

In FIG. 16, reference numeral 1801 denotes a controller for controlling the overall apparatus. The controller 1801 includes a CPU such as a microprocessor and various I/O ports, and performs control by outputting/inputting control signals, data signals, and the like to/from the respective units. Numeral 1802 denotes a display unit for displaying various menus, document information, and image data read by an image reader 1807, and the like on the display screen; 1803, a transparent, pressure-sensitive touch panel mounted on the display unit 1802. By pressing the surface of the touch panel 1803 with a finger or the like, item-input operation, coordinate-position input operation or the like can be performed on the display unit 1802.

Numeral 1804 denotes an FM (frequency modulation) sound source for storing music information, created by a music editor or the like, in a memory unit 1810 or an external memory unit 1812 as digital data, and reading out the information from such a memory, thereby performing FM modulation of the information. An electrical signal from the FM sound source 1804 is converted into an audible sound by a speaker 1805. A printer 1806 is used as an output terminal for the word processor, the personal computer, the facsimile apparatus, and the copying machine.

Numeral 1807 denotes an image reader for photoelectrically reading original data. The image reader 1807 is arranged midway along the original convey passage and designed to read originals. It performs facsimile and copy operations and other various originals.

Numeral 1808 denotes a transmitter/receiver for the facsimile apparatus. The transmitter/receiver 1808 transmits original data read by the image reader 1807 by facsimile, and receives a facsimile signal and decodes the signal. The transmitter/receiver 1808 has an interface function for external units. Numeral 1809 denotes a telephone having a general telephone function as well as various other telephone functions such as an answering function.

Numeral 1810 denotes a memory including a ROM for storing system programs, manager programs, application programs, fonts, and dictionaries, a RAM for storing an application program loaded from the external storage device 1812 and document information, a video RAM, and the like.

Numeral 1811 denotes a keyboard for inputting document information and various commands.

Numeral 1812 denotes an external memory using a floppy disk, a hard disk, and the like as a storage medium. The external storage device 1812 serves to hold document information, music and speech information, application programs of the user, and the like.

Figure 17:
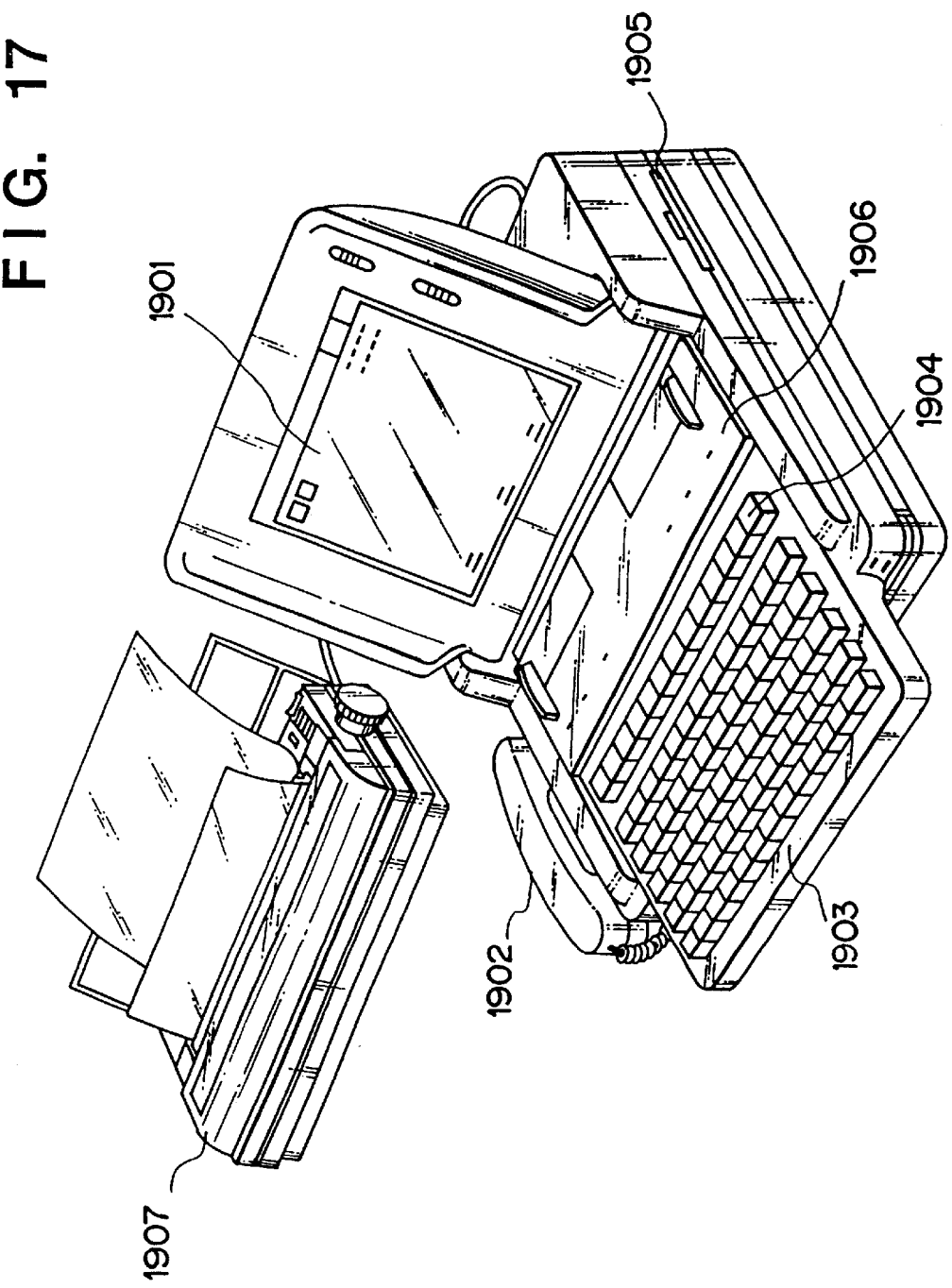
FIG. 17 is a perspective view showing the overview of the information processing apparatus.

FIG. 17 is a perspective view of the information processing apparatus in FIG. 16.

In FIG. 17, numeral 1901 denotes a flat panel display using the above liquid crystal panel, which displays various menus, graphic pattern information, document information, and the like. Coordinate-input or item-designation input operation can be performed on the flat panel display 1901 by pressing the surface of the touch panel 1803 with a finger or the like. Numeral 1902 denotes a handset used when the apparatus is used as a telephone set. A keyboard 1903 is detachably connected to the main body via a cord and is used to perform various document functions and input various data. This keyboard 1903 has various function keys 1904. Numeral 1905 denotes an insertion port through which a floppy disk is inserted into the external storage device 1812.

Numeral 1906 denotes an original table on which an original to be read by the image reader unit 1807 is placed. The read original is discharged from the rear portion of the apparatus. In facsimile receiving operation, received data is printed out by an ink-jet printer 1907.

When the above information processing apparatus is to serve as a personal computer or a word processor, various kinds of information input through the keyboard 1811 are processed by the controller 1801 in accordance with a predetermined program, and the processed information is output, as an image, to the printer 1806.

When the information processing apparatus is to serve as the receiver of the facsimile apparatus, facsimile information input through the transmitter/receiver 1808 via a communication line is subjected to reception processing in the controller 1801 in accordance with a predetermined program, and the resultant information is output, as a received image, to the printer 1806.

When the information processing apparatus is to serve as the copying machine, an original is read by the image reader unit 1807, and the read original data is output, as an image to be copied, to the printer unit 1806 via the controller 1801. Note that when the information processing apparatus is to serve as the receiver of the facsimile apparatus, original data read by the image reader 1807 is subjected to transmission processing in the controller 1801 in accordance with a predetermined program, and the resultant data is transmitted to a communication line via the transmitter/receiver 1808.

Figure 18:
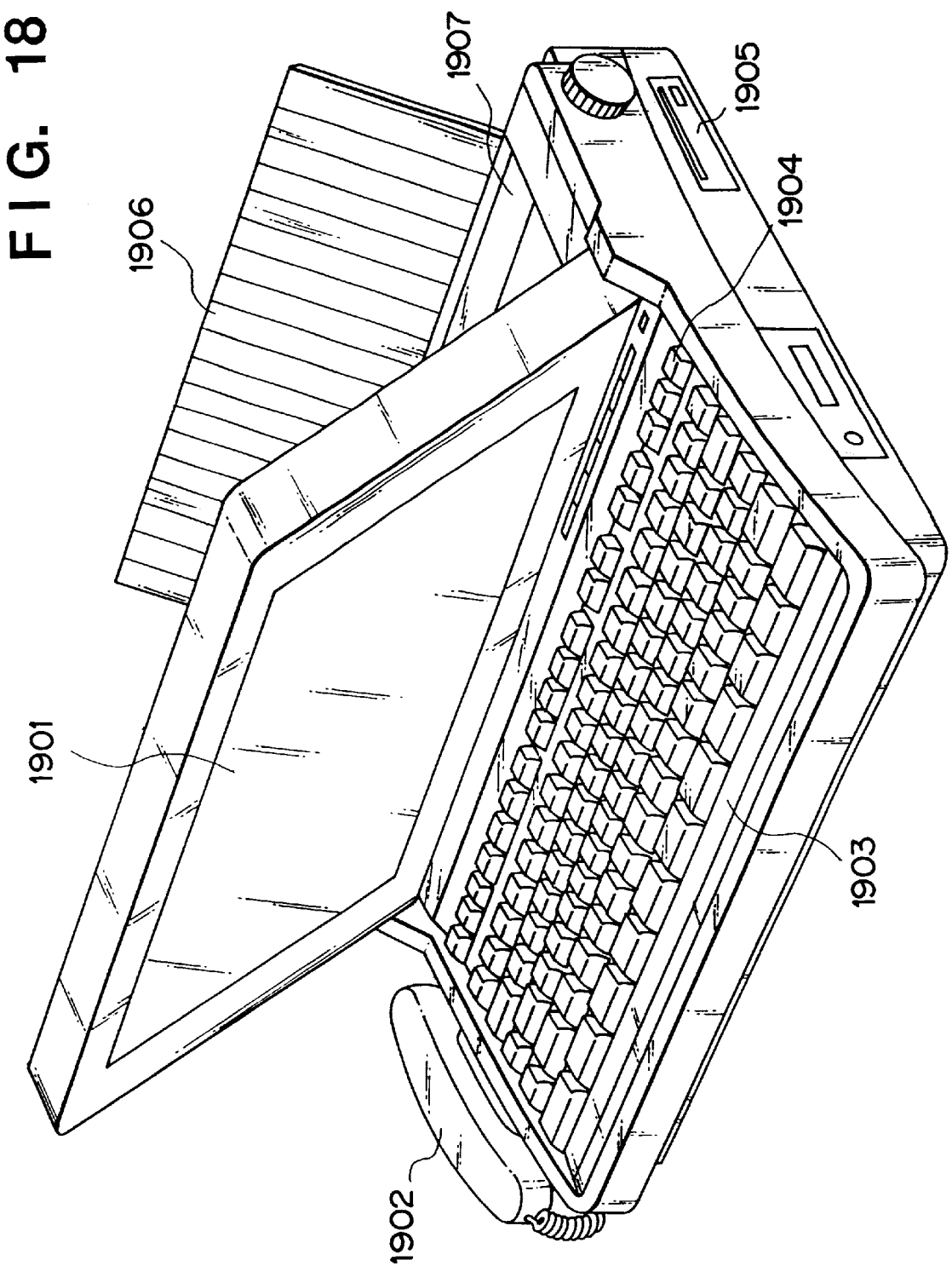
FIG. 18 is a perspective view showing the construction of the information processing apparatus.

Note that the above information processing apparatus may be designed as an integrated apparatus incorporating an ink-jet printer in the main body, as shown in FIG. 18. In this case, the portability of the apparatus can be improved. The same reference numerals in FIG. 18 denote parts having the same functions as those in FIG. 17.

Figure 3:
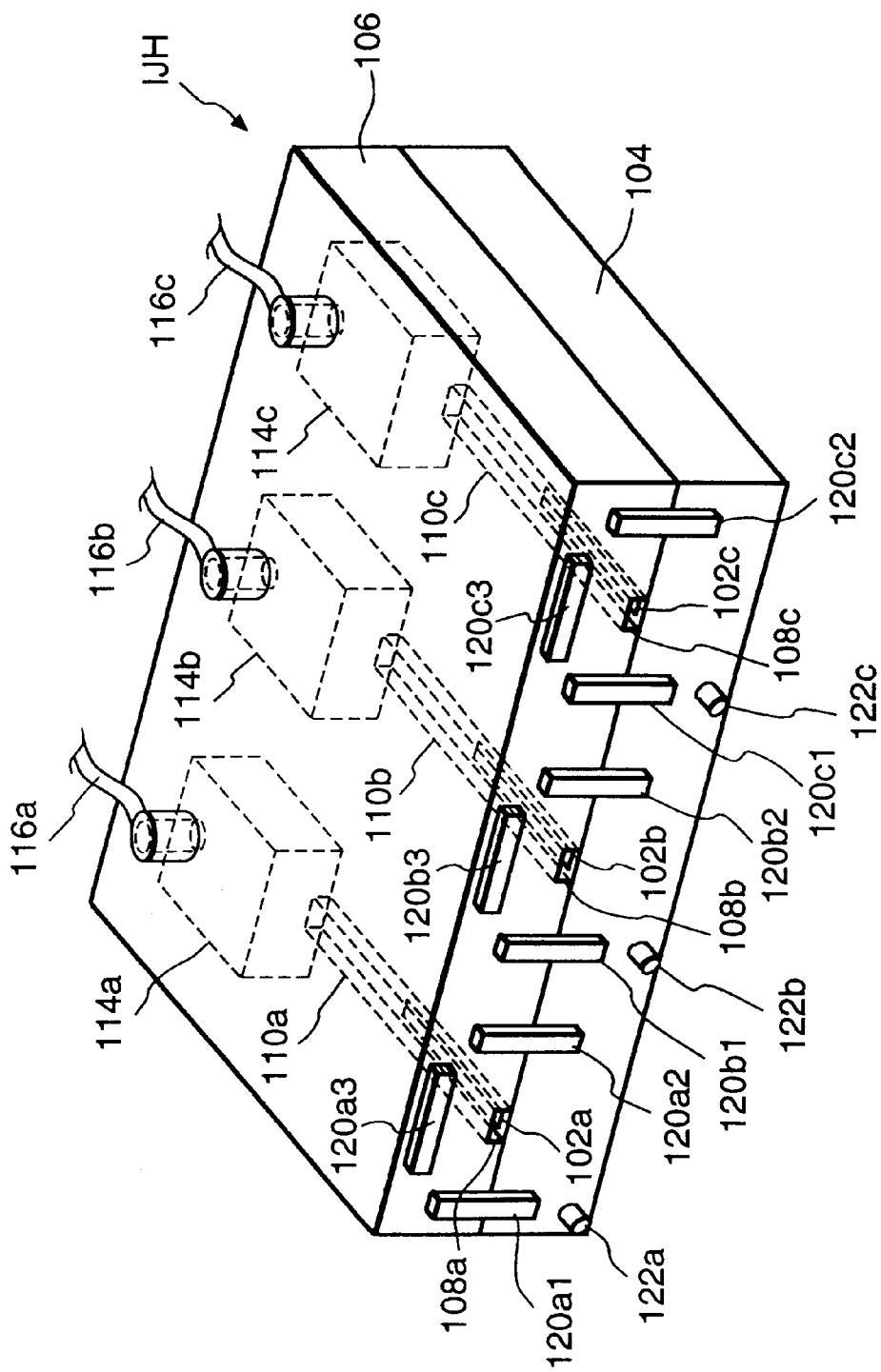
FIG. 3 is a perspective view showing the structure of an ink-jet head IJH for spraying ink on a layer to be colored.

FIG. 3 shows the structure of an ink-jet head IJH for spraying ink on the layer 14 in the color filter as described above.

In FIG. 3, the ink-jet head IJH mainly comprises a heater board 104 as a board on which three heaters 102*a*, 102*b* and 102*c* (respectively correspond to R, G and B colors) for heating an ink are formed, and a top plate 106 mounted on the heater board 104. Three discharge orifices 108*a*, 108*b* and 108*c* are formed in the top plate 106, and tunnel-like ink channels 110*a*, 110*b* and 110*c* are formed therebehind. The respective ink channels 110*a*, 110*b* and 110*c* are connected to ink chambers 114*a*, 114*b* and 114*c* at the rear side. For example, the ink chamber 114*a* is supplied with red (R) ink from an ink supply orifice 116*a*; the ink chamber 114*b* is supplied with green (G) ink from an ink supply orifice 116*b*; and the ink chamber 114*c* is supplied with blue (B) ink from an ink supply orifice 116*c*. The R, G and B inks supplied to the ink chambers 114*a*, 114*b* and 114*c* are respectively discharged from the discharge orifices 108*a*, 108*b* and 108*c* via the ink channels 110*a*, 110*b* and 110*c*.

As described above, the heaters 102*a*, 102*b* and 102*c* for heating ink are provided at the positions corresponding to the ink channels 110*a*, 110*b* and 110*c* on the heater board 104. When a predetermined drive pulse is supplied to the heaters 102*a*, 102*b* and 102*c*, inks on the heaters 102*a*, 102*b* and 102*c* are boiled to produce bubbles, and the inks are pushed and discharged from the discharge orifices 108*a*, 108*b* and 108*c* upon volume expansion of the inks. Therefore, the size of the bubbles can be adjusted by controlling the drive pulse applied to the heaters 102*a*, 102*b* and 102*c*, e.g., controlling the magnitude of power. That is, the volume of the ink discharged from the discharge orifices 108*a*, 108*b* and 108*c* can be arbitrarily controlled. Also, ink-discharge timing can be arbitrarily controlled by adjusting drive-pulse generation timing.

Light position sensors 120*a*1 to 120*a*3, 120*b*1 to 120*b*3 and 120*c*1 to 120*c*3 for detecting the central positions of the filter elements 10*a* are provided around the respective discharge orifices on the front surface of the ink-jet head IJH. The light position sensors respectively comprise a light-reflecting type sensor having a line sensor such as a CCD and a light-emitting device adjacent to the line sensor. As the light-emitting device emits light and the line sensor receives the reflected light, the central position of the filter element 10*a* is detected from the amount of the received light. The relative positions of the light position sensors and the discharge orifices 108*a*, 108*b* and 108*c* are exactly set in advance, accordingly, the central positions of the discharge orifices 108*a*, 108*b* and 108*c* can be aligned to positions above the central positions of the filter elements 10*a* detected by the light position sensors 120*a*1 to 120*a*3, 120*b*1 to 120*b*3 and 120*c*1 to 120*c*3.

Around the discharge orifices 108*a*, 108*b* and 108*c*, distance sensors 122*a*, 122*b* and 122*c* which are non-contact type sensors, e.g. capacity type sensors or light sensors, are provided for detecting the distances between the discharge orifices 108*a*, 108*b* and 108*c* and the layer 14 to be colored. To control the distances between the discharge orifices and the layer 14 detected by the distance sensors to be constant, feedback operation is performed to make period of flight of ink droplets fixed. This prevents degradation of precision of ink-application on the layer 14.

Figure 4:
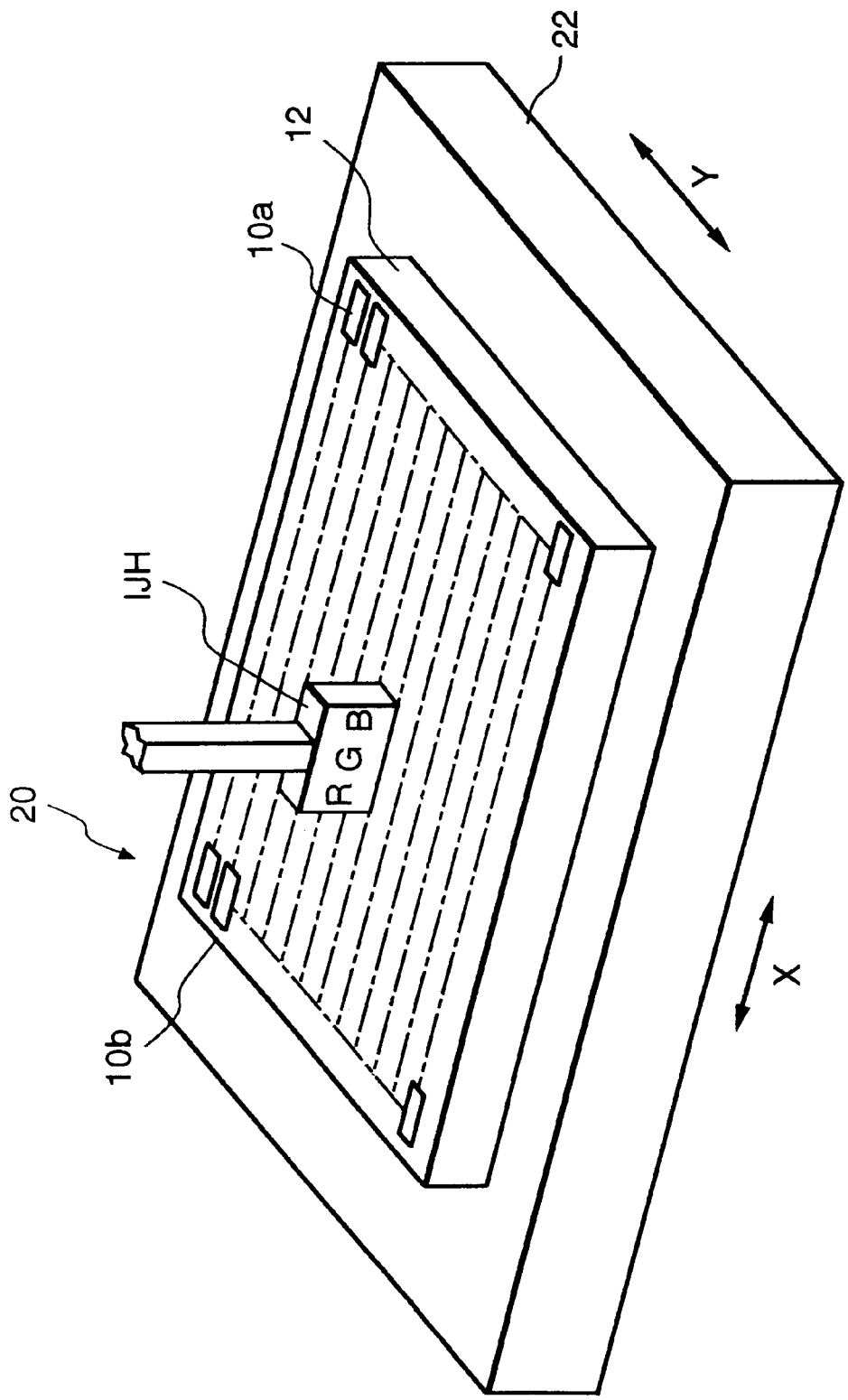
FIG. 4 is a perspective view showing the arrangement of an apparatus for manufacturing the color filter shown in FIGS. 1 and 2.

Next, FIG. 4 shows the arrangement of an apparatus for manufacturing the color filter shown in FIGS. 1 and 2.

In FIG. 4, an apparatus 20 comprises an XY table 22 mounted on a base (not shown) and movable in the X and Y directions, and an ink-jet head IJH fixed on the base via a support member (not shown) above the XY table 22. A glass substrate 12, on which the light-shielding grating 10*b* and the layer 14 (see FIG. 2) to be colored are formed by the above method, is placed on the XY table 22. As described in FIG. 3, the ink-jet head IJH has the discharge orifice 108*a* for discharging red (R) ink, the discharge orifice 108*b* for discharging green (G) ink and the discharge orifice 108*c* for discharging blue (B) ink. the discharge orifices 108*a*, 108*b* and 108*c* can independently discharge ink. Around the respective discharge orifices 108*a*, 108*b* and 108*c*, the light position sensors 120*a*1 to 120*a*3, 120*b*1 to 120*b*3 and 120*c*1 to 120*c*3, and the distance sensors 122*a*, 122*b* and 122*c* are provided.

In the manufacturing apparatus 20 having the above arrangement, R, G or B ink is discharged into a desired frame of the light-shielding grating 10*b* while the XY table moves in the X and Y directions with respect to the ink-jet head IJH. In this manner, each frame of the light-shielding grating 10*b* is colored to complete a color filter. At this time, the light position sensors 120*a*1 to 120*a*3, 120*b*1 to 120*b*3 and 120*c*1 to 120*c*3 detect the central positions of the filter elements 10*a*, and the coloring is performed such that the central position of the discharge orifice 108*a*, 108*b* or 108*c* coincides with the central position of the filter element 10*a*. This enables to discharge ink exactly to the center of the filter element 10*a* even if the glass substrate 12 is deformed due to, e.g., temperature change and the pitch between the filter elements 10*a* being changed. Further, the distance sensors 122*a*, 122*b* and 122*c* detect the distances between the glass substrate 12 and the discharge orifices 108*a*, 108*b* and 108*c*, to move the ink-jet head IJH up/down so that the distances are always constant, which prevents shifting of ink-application position.

Figure 5:
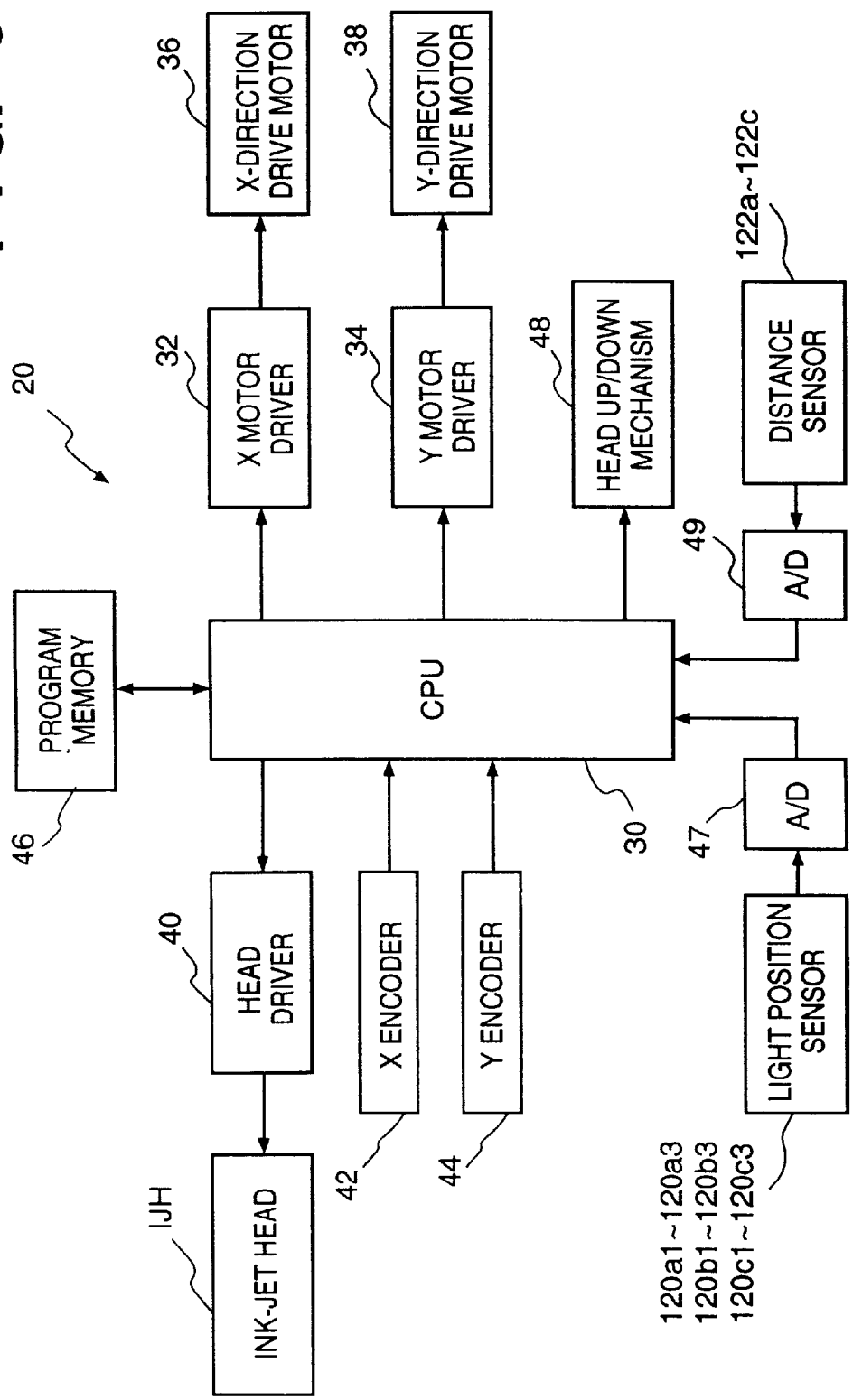
FIG. 5 is a block diagram showing the construction of the color filter manufacturing apparatus.

FIG. 5 is a block diagram showing the construction of the manufacturing apparatus 20.

In FIG. 5, X- and Y-direction drive motors 36 and 38 for driving the XY table 22 in the X and Y directions are connected to a CPU 30 which controls the overall operation of the manufacturing apparatus 20, via X- and Y-motor drivers 32 and 34. The CPU 30 is also connected to the ink-jet head IJH via a head driver 40. Furthermore, X and Y encoders 42 and 44 for detecting the position of the XY table 22 is connected to the CPU 30. With this arrangement, position information on the XY table 22 is input into the CPU 30. Also, a control program in a program memory 46 is inputted into the CPU 30. The CPU 30 moves the XY table 22 in accordance with this control program and position information from the X and Y encoders 42 and 44. With this operation, a desired grating frame on the glass substrate 12 is brought to a position below the ink-jet head IJH, and ink having a desired color is discharged into the frame to color it. A color filter is manufactured by performing this operation for each filter element 10a.

It should be noted that the CPU 30 is connected to the distance sensors 122a, 122b and 122c via an A/D converter 49, and that the CPU 30 controls a head up/down mechanism 48 for moving the ink-jet head IJH upward/downward based on distance information from the distance sensors, so as to slightly adjust the distances between the discharge orifices 108a, 108b and 108c of the ink-jet head IJH and the glass substrate 12 to constant values. The CPU 30 slightly adjusts the position of the XY table 22 based on information from the light position sensors 120a1 to 120a3, 120b1 to 120b3 and 120c1 to 120c3, so as to bring the position of the discharge orifices 108a, 108b and 108c to the central positions of the filter elements 10a (so-called "tracking control").

Next, a concrete method for the tracking control will be described with reference to FIGS. 6 and 7.

Figure 6:
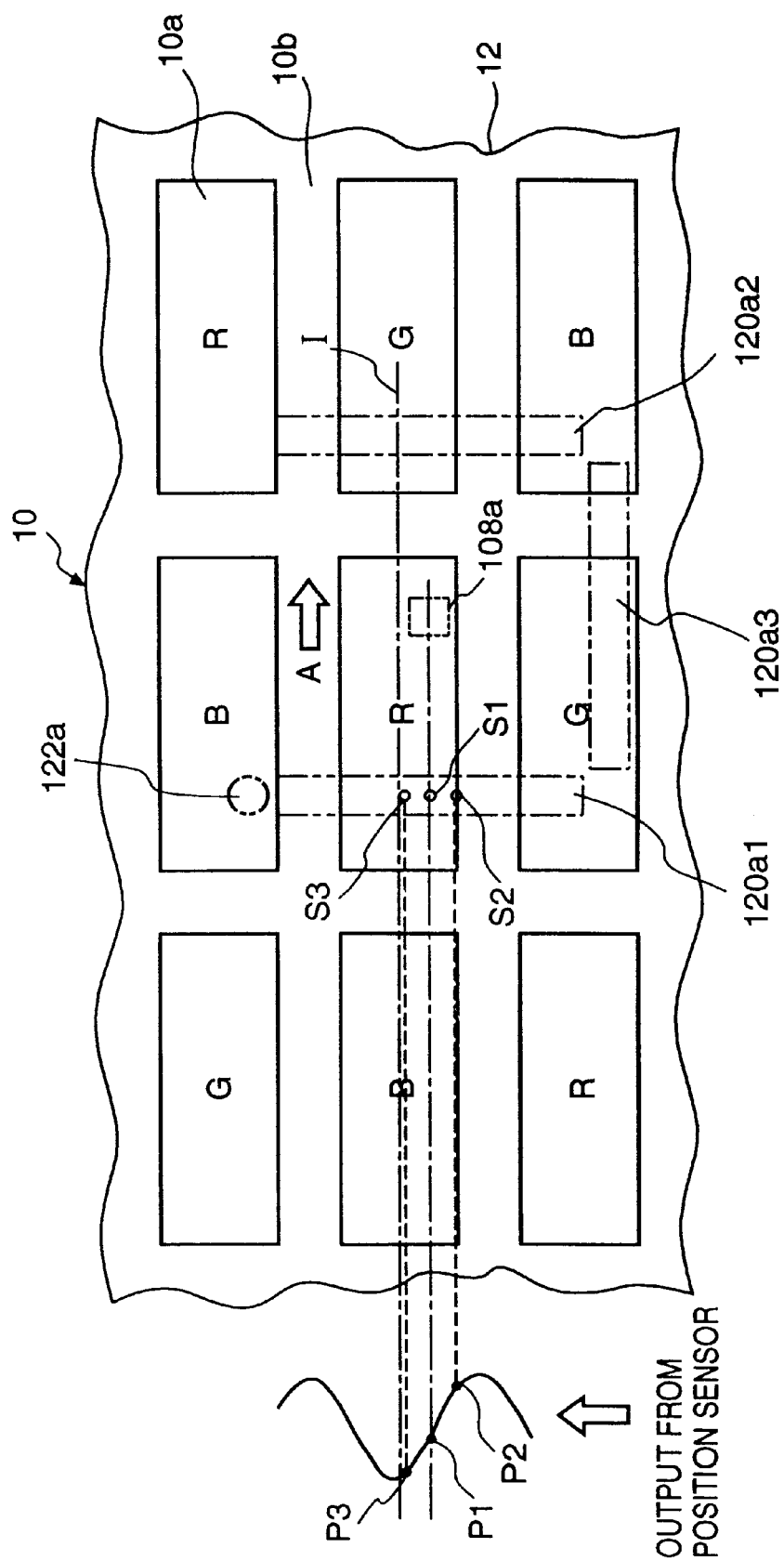
FIGS. 6 and 7 are partial enlarged views showing the positional relation between discharge nozzles and filter elements in a case where the filter elements on a substrate are colored by the ink-jet head IJH.
Figure 7:
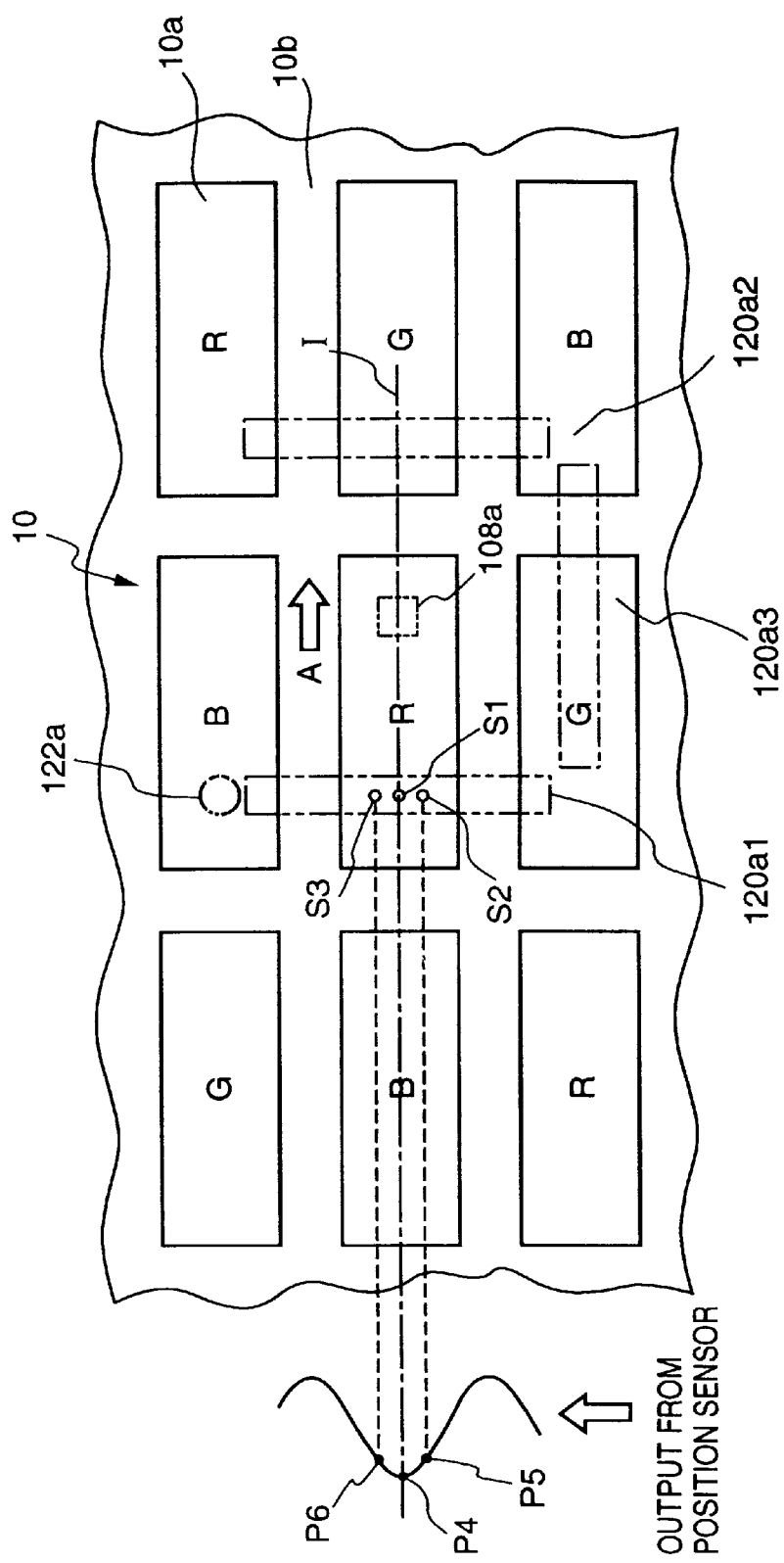

FIGS. 6 and 7 are partial enlarged views showing the positional relation between discharge nozzles and the filter elements 10a in a case where the filter elements on the substrate 12 are colored by the ink-jet head IJH. Note that the ink-jet head IJH has the three discharge orifices 108a, 108b and 108c, but the same tracking operation is commonly used for the respective discharge orifices, therefore, only the tracking control for the discharge orifice 108a for discharging red ink will be described below.

In FIGS. 6 and 7, alternate long and two short dashed lines indicate the red-ink discharge orifice 108a positioned above the filter element 10a (R) to be colored red, the light position sensors 120a1 to 120a3 and the distance sensor 122a provided around the discharge orifice 108a. An arrow A indicates a moving direction of the XY table 22 (i.e., substrate 12). That is, the ink-jet head IJH colors the filter elements 10a while moving relatively to the substrate 12 in an direction opposite to the arrow A direction (main-scanning).

Upon this main-scanning, an output signal from, e.g., the light position sensor 120a1 as shown in FIGS. 6 and 7 enters the CPU 30. That is, light emitted from the light-emitting device of the light position sensor 120a1 toward the substrate 12 passes through the filter element 10a, but is reflected by the light-shielding grating 10b, then the reflected light enters the light sensor such as a CCD line sensor. Accordingly, at the central portion of the light-shielding grating 10b, the amount of reflected light received by the light sensor is the greatest, while at the central portion of the filter element 10a, the amount of reflected light is the minimum. When the amount of reflected light is large, the pixel of the line sensor outputs a high voltage, while when the amount of reflected light is small, the line sensor pixel outputs a low voltage. The output is inverted by an inverter (not shown), and the inverter outputs, when the amount of reflected light is large, a low voltage, while when the amount of reflected light is small, a high voltage. The output voltage is converted by an A/D converter 47 into a digital signal and inputted into the CPU 30. A signal waveform of the digital signal inputted into the CPU 30 is as shown in FIGS. 6 and 7.

In FIG. 6, in the position-detection system having the above construction, if the central position of the discharge orifice 108a is shifted from the center line I of the filter element 10a (R), a pixel S1 of the line sensor at a position opposing to the central position of the discharge orifice 108a outputs an output signal P1. A pixel S2 positioned below the pixel S1 outputs an output signal P2 that has a value smaller than that of the signal P1; a pixel S3 above the pixel S1 outputs an output signal P3 that has a value greater than that of the signal P1. Accordingly, the CPU 30 compares the signal P1 from the pixel S1 with the signal P2 from the pixel S2 and the signal P3 from the pixel S3, to determine the direction in which the discharge orifice is shifted from the central position of the filter element 10a (R). In FIG. 6, the CPU determines that the pixel S1, i.e., the discharge orifice 108a is shifted downward from the central position of the filter element 10a (R). Then the CPU 30 performs slight adjustment of the XY table 22 to move the substrate 12 downward in FIG. 6.

In this manner, a slight adjustment of the substrate 12 position moves the center line I of the filter element 10a to a position aligned with the central position of the discharge orifice 108a. As shown in FIG. 7, the central position of the discharge orifice 108a comes to the position exactly above the center line I of the filter element 10a, and the pixel S1 outputs an output signal P4 corresponding to the peak of the output signal waveform. The CPU 30 detect that the central position of the discharge orifice 108a and that of the filter element 10a (R) are aligned and stops the motion of the XY table 22 in a subscanning direction.

As described above, the CPU 30 performs tracking by comparing the output signal from the pixel S1 corresponding to the discharge orifice 108a position with the output signals from the adjacent pixels S2 and S3, and aligns the central position of the discharge orifice 108a with that of the filter element 10a (R).

Note that the light position sensor 120a2 can also detect the central position of the filter element 10a(R). In a case where the discharge orifice 108a is scanned in a direction opposite to that in FIG. 6, an output signal from the light position sensor 120a2 is used for tracking.

Further, the light position sensor 120a3 detects the position of the filter element 10a (R) in the main-scanning direction by a principle as described above. The CPU 30 sets ink-discharge timing from these detection signals, and performs control so as not to shift ink-dot position from the filter element 10a (R).

The distance sensor 122a always monitors the distance between the discharge orifice 108a and the substrate 12, and the CPU 30 controls the head up/down mechanism 48 based on detection signals from the distance sensor 122a so as to maintain a constant distance between the discharge orifice 108a and the substrate 12.

Note that in the present embodiment, the light position sensors are provided around the discharge orifices 108a, 108b and 108c, by three sensors per one orifice. In this construction, tracking can be separately performed for the respective discharge orifices. For this reason, in the case of FIG. 1, where filter elements of three colors are arranged on one line in the main-scanning direction, it is effective to perform three trackings to color all the filter elements on one line. For example, at the first scanning, to color only a red filter element, the light position sensors 120a1 to 120a3 are used for tracking control; at the second scanning, to color only a green filter element, the light position sensors 120b1 to 120b3 are used for tracking control; and at the third scanning, to color only the blue filter element, the light position sensors 120c1 to 120c3 are used for tracking control. In this manner, the tracking controls for the respective discharge orifices are made using the light position sensors respectively provided around the discharge orifices. This improves tracking precision.

Figure 12:
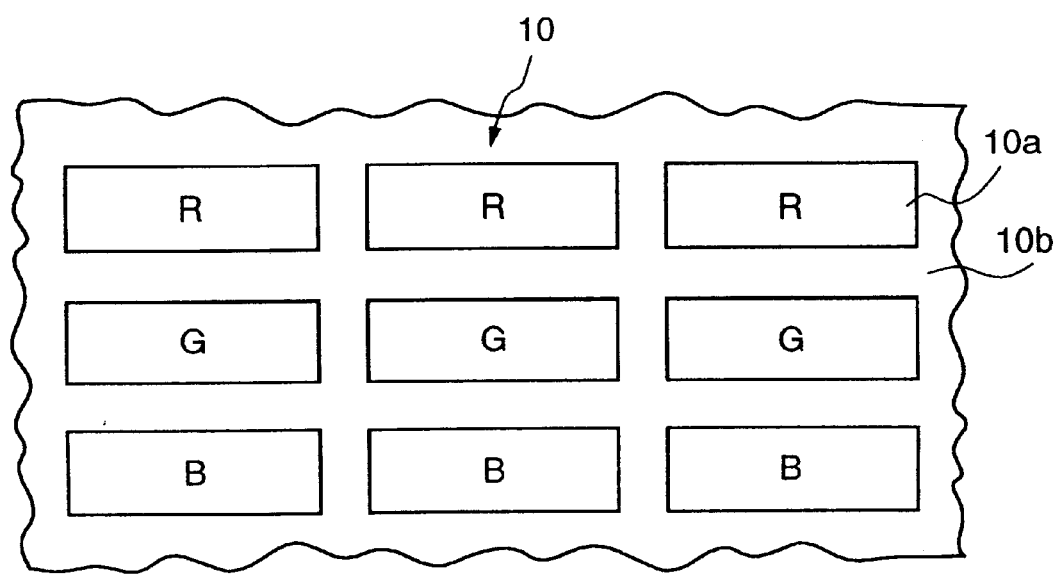
FIG. 12 is a partial enlarged view showing a color filter having filter elements of the same color in each main-scanning line.

Further, in a case of FIG. 12, where filter elements in one color are arranged on a main-scanning one line, the tracking control may be once instead of thrice as above. In FIG. 12, as the filter elements on the first line are red, the light position sensors 120a1 to 120a3 are used for tracking control; as the filter elements on the second line are green, the light position sensors 120b1 to 120b3 are used for tracking control; and as the filter elements on the third line are blue, the light position sensors 120c1 to 120c3 are used for tracking control. In this manner, if the filter elements on one main-scanning line are of the same color, all the filter elements are colored at one scanning without degrading tracking precision.

Figure 8:
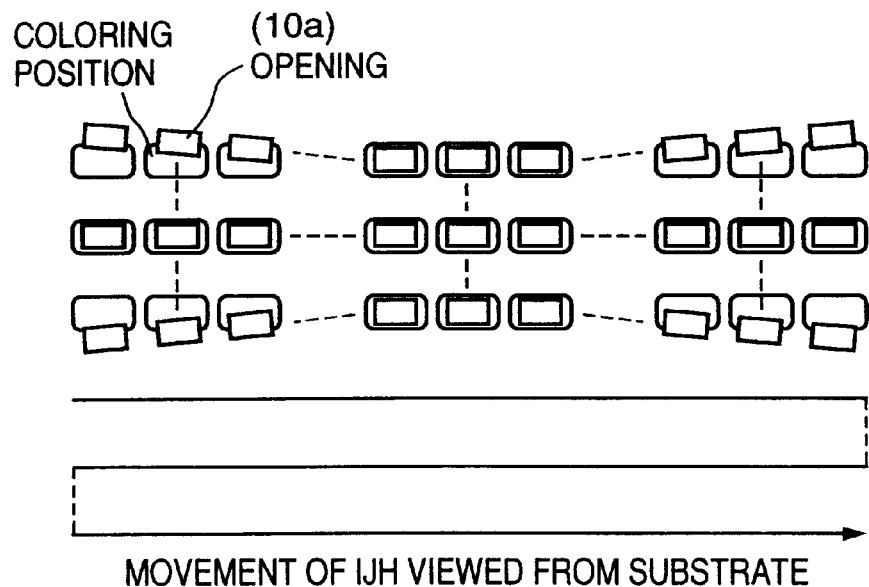
FIGS. 8 and 9 are explanatory views respectively showing a case where the substrate has uneven temperature distribution and the arrangement of the filter elements is distorted.
Figure 9:
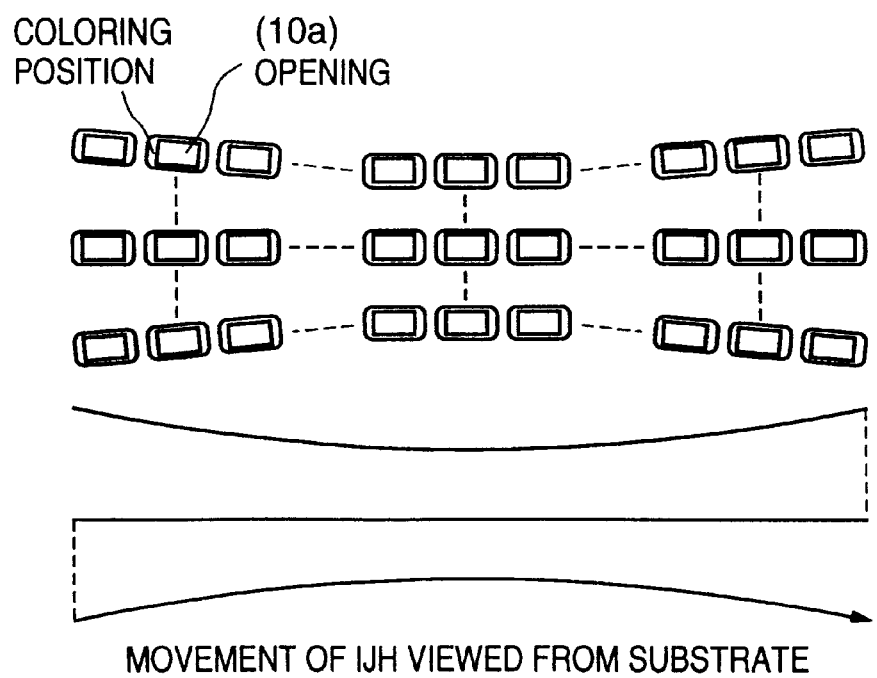

FIGS. 8 and 9 are explanatory views respectively showing a case where the substrate has temperature distribution and the arrangement of the filter elements is distorted.

In a conventional color-filter manufacturing apparatus, as the position of the filter elements 10a are not detected, the filter element positions are shifted from coloring positions, which results in a defective product. On the other hand, in the present embodiment, tracking is performed following the arrangement of the filter elements 10a, thus preventing defects in color filters due to shifted positions of filter elements and coloring positions.

Figure 10:
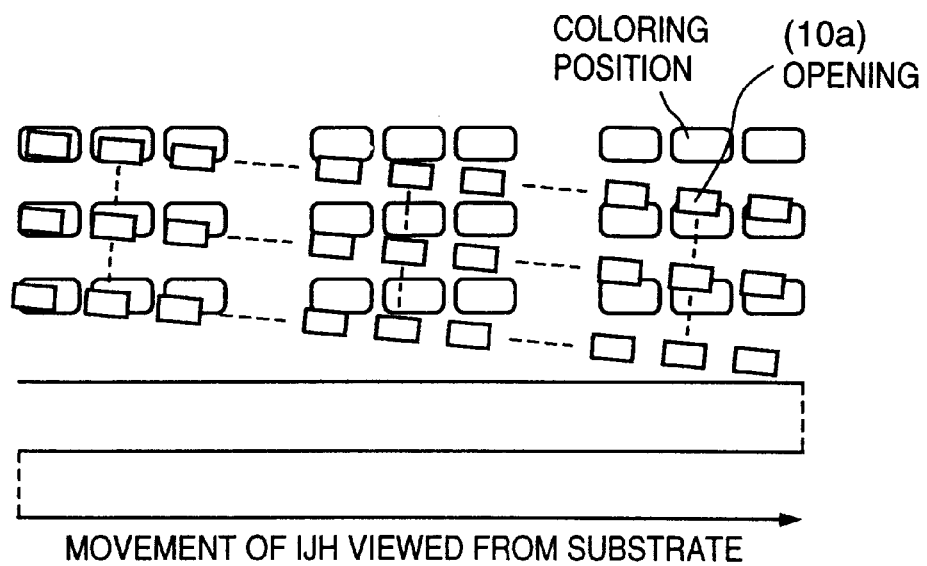
FIGS. 10 and 11 are explanatory views showing a case where the substrate is attached slanted with respect to an XY table.
Figure 11:
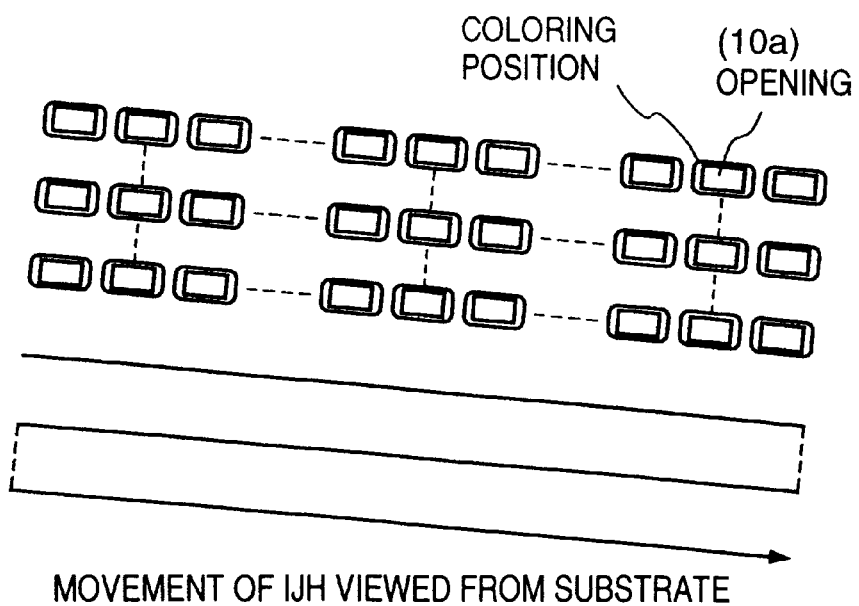

FIGS. 10 and 11 are explanatory views showing a case where the substrate is attached slanted with respect to an XY table.

Also in the conventional manufacturing apparatus, the positions of the filter elements 10a are shifted from coloring positions. On the other hand, as shown in FIG. 11, in the present manufacturing apparatus, the positions of filter elements and coloring positions coincide. Thus, the present embodiment avoids producing defective color filters.

[Second Embodiment]

Figure 13:
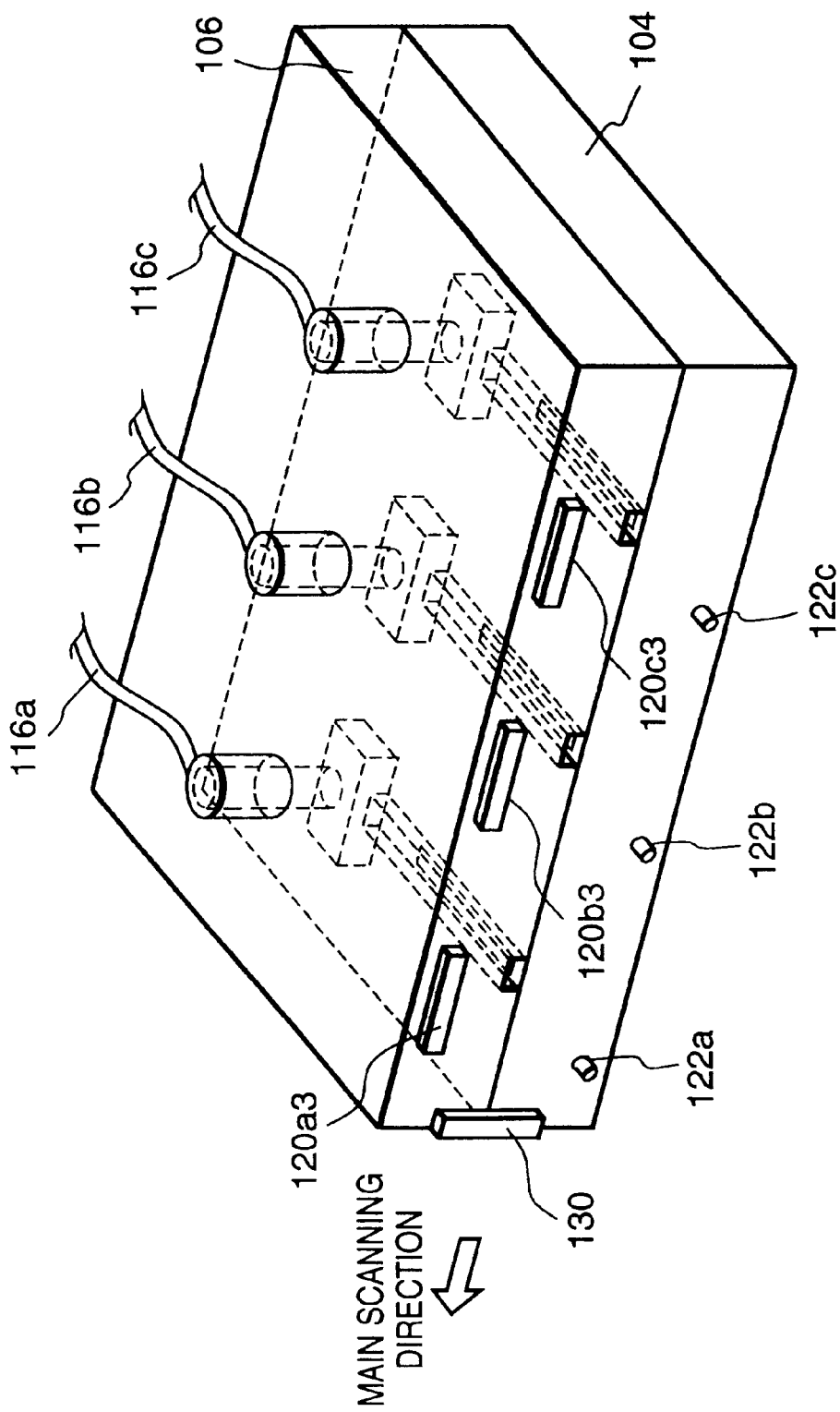
FIG. 13 is a perspective view showing the arrangement of the ink-jet head according to another embodiment.

FIG. 13 shows the construction of the ink-jet head IJH according to a second embodiment of the present invention.

The ink-jet head IJH of this embodiment has a light position sensor 130 for tracking control at only one portion on the front side surface of the head. Except the light position sensor 130, the ink-jet head IJH has the same construction as that of the first embodiment. The light position sensor 130 has the same construction of the light position sensor (e.g., 120a1, 120a2 and 120a3) of the first embodiment, and operates in accordance with the same position-detection principle.

In the second embodiment, the light position sensor 130 at the head position in the main-scanning direction detects the position of uncolored filter element 10a, and tracking control of the ink-jet head IJH is performed based on the detected position. In this case, tracking precision in tracking of the red discharge orifice 108a, which is the closest to the light position sensor 130, is the highest. It is considered that the position of three filter elements are substantially aligned on the same line even though the substrate 12 is distorted due to uneven temperature distribution, therefore, tracking precision in tracking of the green discharge orifice 108b and that the blue discharge orifice 108c are not degraded to a problematic level. That is, this construction meets requirements in color-filter manufacture in practice. Further, even if filter elements for a plurality of colors are arranged on one line, the tracking using only one light position sensor can color all the filter elements on one line at one scanning in the main-scanning direction.

[Third Embodiment]

In a third embodiment, the ink-jet head IJH is the same as that of the second embodiment. The feature of the third embodiment is as follows.

In the second embodiment, the position of filter element (e.g., a red filter element) real-timely detected by the light position sensor 130 is used as the positions of other filter elements (e.g., green and blue filter elements). In this embodiment, a memory (not shown) for storing a detection signal from the light position sensor 130 is provided. As the light position sensor 130 passes a filter element, the detection signal from the light position sensor 130 is stored into the memory. Then, the positions of the other filter elements are exactly obtained from the data stored in the memory, thus tracking precision can be improved.

Figure 15:
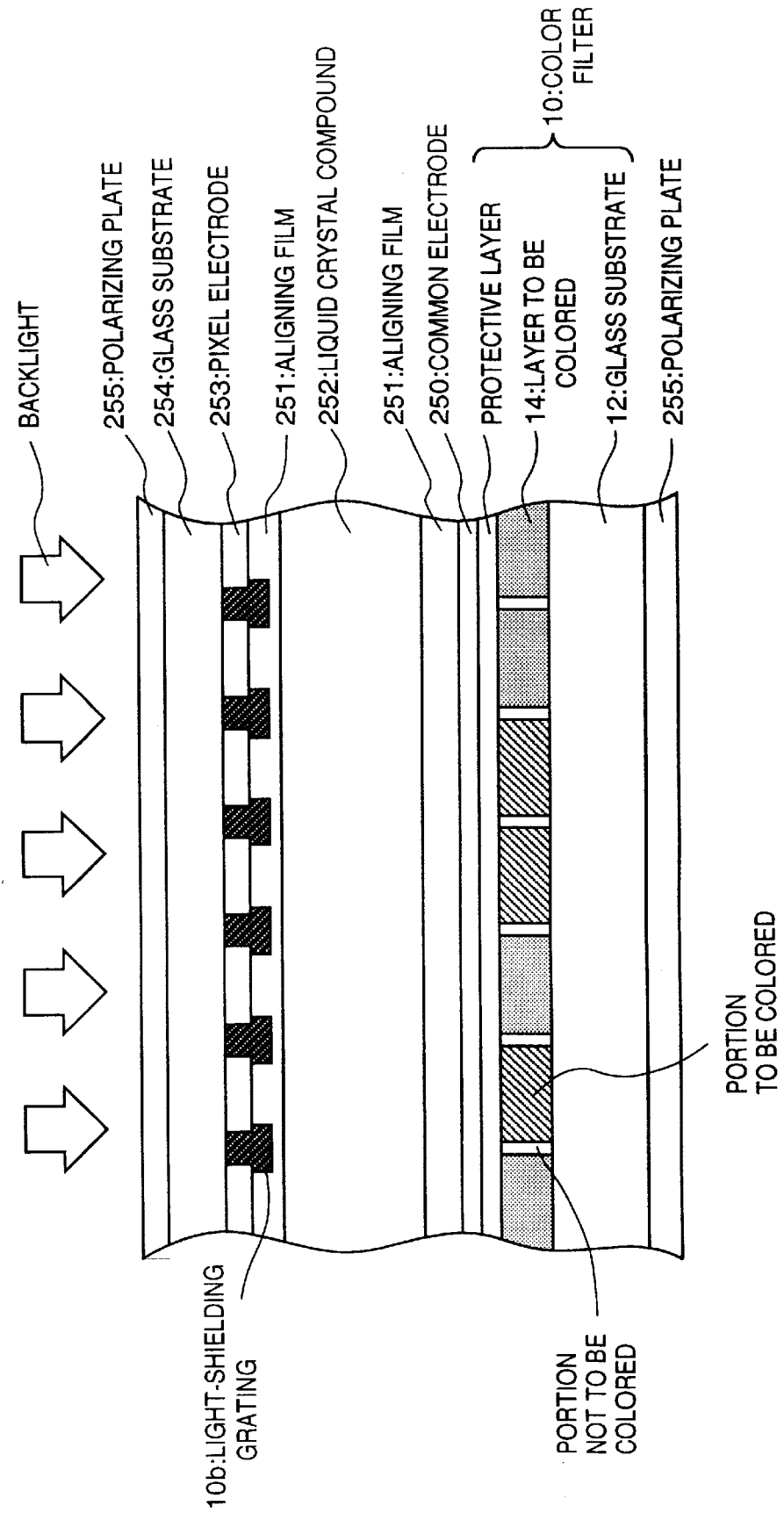

It should be noted that in the above description, the light-shielding grating 10b is formed on the glass substrate 12. However, as shown in FIG. 15, in a case where the light-shielding grating 10b is formed between a glass substrate 254 and a liquid crystal compound 252, tracking control of the present invention can be applied. In this case, a pattern for position detection in tracking control may be formed on the substrate 12 in place of the light-shielding grating 10b.

As described above, according to the present invention, since the ink-jet head performs tracking following the positions of filter elements, even if the positions of filter elements are shifted due to, e.g., distortion of the substrate, the positions of filter elements always coincide with those of coloring positions.

Note that the present invention is applicable to further correction and modification to the above embodiment within its scope.

For example, in the embodiments, the ink-jet head is fixed and the XY table is moved, however, the XY table may be fixed but the ink-jet head may be moved instead.

Further, a piezo type head using mechanical energy converter such as a piezoid can be used as an ink-jet head.

Further, the present invention is applicable to a monochromatic color filter.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on-demand type or a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only an exchangeable chip type printhead, as described in the above embodiment, which can be electrically connected to the apparatus main unit and can receive an ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

As described above, according to the embodiments, the positions of filter elements are pre-detected, and coloring of filter elements is performed while the relative positions between the orifice nozzles and the substrate are corrected.

Further, position correction is made not only in a sub-scanning direction, but also in a main-scanning direction, i.e., shifted positions of filter elements along the main-scanning direction are detected and discharge timings of nozzles are corrected. This reduces defective color filters.

The present invention is not limited to the above embodiments and various changes and modifications can be made within the spirit and scope of the present invention. Therefore, to apprise the public of the scope of the present invention, the following claims are made.

What is claimed is:

1. A color filter manufacturing method for forming plural filter elements on a substrate by discharging ink from a discharge nozzle to the substrate and coloring in predetermined colors, said method comprising the steps of:

obtaining distance information corresponding to a distance between the substrate and the discharge nozzle in a discharge direction of the ink which is discharged towards the substrate from the discharge nozzle;

adjusting the distance between the substrate and the discharge nozzle to a predetermined distance based on the result of said distance information obtaining step;

correcting a relative position of a filter element and the discharge nozzle in a direction substantially perpendicular to the discharge direction of the ink so that the filter element and the discharge nozzle are aligned; and forming the plural filter elements by discharging the ink from the discharge nozzle onto the substrate with the distance between the substrate and the discharge nozzle being adjusted in said distance adjusting step to the predetermined distance, wherein said adjusting step is performed before said correcting step.

2. The color filter manufacturing method according to claim 1, wherein the plural filter elements are partitioned by a light-shielding portion formed in a predetermined pattern.

3. The color filter manufacturing method according to claim 1, wherein in said distance information obtaining step the distance between the discharge nozzle and the substrate is detected by a distance sensor, and wherein the discharge nozzle is scanned in a state where the distance between the discharge nozzle and the substrate is maintained constant, based on an output signal from the distance sensor.

4. The color filter manufacturing method according to claim 1, wherein the discharge nozzle is included in an ink-jet head for performing printing by discharging the ink in said forming step.

5. The color filter manufacturing method according to claim 4, wherein the ink-jet head comprises a printhead that discharges the ink in said forming step utilizing thermal energy, and comprises a thermal energy generator for generating thermal energy to be supplied to the ink.

6. A color filter manufacturing method according to claim 1, further comprising the step of:

detecting position information of a filter element on the substrate, wherein the filter element is formed by discharging the ink from the discharge nozzle in said forming step, at a position after correction of the relative position based on position information of the filter element detected in said position detecting step, to the substrate.

7. The color filter manufacturing method according to claim 6, wherein the position of the filter element is detected by a position sensor at which the relative position of the filter element and the discharge nozzle is positioned in advance.

8. The color filter manufacturing method according to claim 6, wherein a large number of the filter elements are arranged in a two-dimensional matrix form, and in said correcting and forming steps the discharge nozzle sequentially colors the filter elements while scanning the filter elements in a main-scanning direction and a sub-scanning direction.

9. The color filter manufacturing method according to claim 8, wherein in said correcting and forming steps, while the discharge nozzle is scanned along an array of filter elements on one line in the main-scanning direction, a relative position of the discharge nozzle and the filter element in the sub-scanning direction is corrected.

10. The color filter manufacturing method according to claim 8, wherein in said correcting and forming steps, while the discharge nozzle is scanned along an array of filter elements on one line in the main-scanning direction, a relative position of the discharge nozzle and the filter element in the main-scanning direction is detected by a second position sensor, and timing of discharging the ink from the discharge nozzle is controlled based on the relative position detected by the second position sensor.

11. A color filter manufacturing apparatus for forming plural filter elements on a substrate by discharging ink from a discharge nozzle to the substrate and coloring in predetermined colors, said apparatus comprising:

means for obtaining distance information corresponding to a distance between the substrate and the discharge nozzle in a discharge direction of the ink which is discharged towards the substrate from the discharge nozzle;

adjusting means for adjusting the distance between the substrate and the discharge nozzle to a predetermined distance based on the result obtained by said means for obtaining distance information;

correcting means for correcting a relative position of a filter element and the discharge nozzle in a direction substantially perpendicular to the discharge direction of the ink so that the filter element and the discharge nozzle are aligned; and discharge control means for controlling the discharge nozzle so as to discharge the ink on the substrate with the distance between the substrate and the discharge nozzle being adjusted to the predetermined distance by said adjusting means, wherein said adjusting means adjusts the distance between the substrate and the discharge nozzle before said correcting means corrects the relative position of the filter element and the discharge nozzle.

12. A color filter manufacturing apparatus according to claim 11, wherein said correcting means comprises:

moving means for moving the discharge nozzle or the substrate, relatively to each other;

a position sensor for detecting position information of the filter element, said position sensor having a preset relative position to the discharge nozzle; and position control means for controlling said moving means so that the filter element and the discharge nozzle are aligned, based on the position information of the filter element detected by said position sensor, wherein said discharge control means controls the discharge nozzle to discharge the ink, in a state where the filter element and the discharge nozzle are aligned, to color the filter element.

13. The color filter manufacturing apparatus according to claim 11, wherein the plural filter elements are partitioned by a light-shielding portion formed in a predetermined pattern.

14. The color filter manufacturing apparatus according to claim 11, wherein said position control means controls scanning of the discharge nozzle in a state where the distance between the discharge nozzle and the substrate is maintained constant, based on the result obtained by said means for obtaining distance information.

15. The color filter manufacturing apparatus according to claim 11, wherein the discharge nozzle is included in an ink-jet head for performing printing by discharging the ink.

16. The color filter manufacturing apparatus according to claim 15, wherein the ink-jet head is a printhead that discharges the ink utilizing thermal energy, and comprises a thermal energy generator for generating thermal energy to be supplied to the ink.

17. The color filter manufacturing apparatus according to claim 11, wherein the plural filter elements are arranged in a two-dimensional matrix form, and wherein said position control means scans the discharge nozzle on the filter elements on the substrate in a main-scanning direction and a subscanning direction to sequentially color the filter elements all over the substrate.

18. The color filter manufacturing apparatus according to claim 17, wherein while the discharge nozzle or an array of filter elements on one line on the substrate is scanned in the main-scanning direction, said position control means corrects a relative position of the discharge nozzle and the filter element in the subscanning direction.

19. The color filter manufacturing apparatus according to claim 17, further comprising a second position sensor for, while the discharge nozzle or an array of filter elements on one line on the substrate is scanned in the main-scanning direction, detecting a relative position of the discharge nozzle and the filter element in the main-scanning direction, wherein said discharge control means controls timing of discharging the ink from the discharge nozzle, based on the relative position detected by the second position sensor.

* * * * *

UNITED STATES PATENT AND TRADEMARK OFFICE
CERTIFICATE OF CORRECTION

PATENT NO. : 6,207,948 B1
DATED : March 27, 2001
INVENTOR(S) : Yokoi et al.

It is certified that error appears in the above-identified patent and that said Letters Patent is hereby corrected as shown below:

Column 4,
Line 52, "ill" should read -- will --.

Column 5,
Line 18, "referred" should read -- referred to --.

Column 9,
Line 35, "108apositioned" should read -- 108a positioned --.
Line 41, "10awhile" should read -- 10a while --.
Line 42, "an" should read -- a --.

Column 10,
Line 25, "detect" should read -- detects --.

Column 11,
Line 21, "position" should read -- positions --.

Signed and Sealed this

First Day of July, 2003

JAMES E. ROGAN
*Director of the United States Patent and Trademark Office*